United States Patent
Brockhage

[11] Patent Number: 5,890,747
[45] Date of Patent: Apr. 6, 1999

[54] DOUBLE CONTAINMENT BUTT WELD PIPE FITTING

[75] Inventor: Donald J. Brockhage, Milpitas, Calif.

[73] Assignee: Brockhage Associates, A Trust, Milpitas, Calif.

[21] Appl. No.: 751,628

[22] Filed: Nov. 18, 1996

[51] Int. Cl.$^6$ .................................................. F16L 39/00
[52] U.S. Cl. ................................... 285/123.2; 285/288.1; 285/179
[58] Field of Search ............................ 285/133.11, 123.5, 285/123.2, 179, 288.1, 113, 120, 123.1; 138/111, 112, 113

[56] References Cited

U.S. PATENT DOCUMENTS

| | | | |
|---|---|---|---|
| 2,076,210 | 4/1937 | Stadtfeld | 138/113 |
| 2,147,431 | 2/1939 | Ewing | 285/179 |
| 2,280,140 | 4/1942 | Wilson | 138/111 X |
| 4,779,652 | 10/1988 | Sweeney | 138/113 |
| 4,886,305 | 12/1989 | Martin . | |
| 4,903,719 | 2/1990 | Rains . | |
| 4,915,121 | 4/1990 | Rains . | |
| 5,141,260 | 8/1992 | Burwell . | |
| 5,141,261 | 8/1992 | Ziu . | |

FOREIGN PATENT DOCUMENTS

| | | | |
|---|---|---|---|
| 1180657 | 6/1959 | France | 285/113 |
| 934210 | 7/1949 | Germany | 38/55 |
| 830365 | 3/1960 | United Kingdom | 138/111 |

*Primary Examiner*—Eric K. Nicholson
*Assistant Examiner*—Gary Grafel
*Attorney, Agent, or Firm*—Townsend and Townsend and Crew LLP

[57] ABSTRACT

A double containment pipe fitting (10) has inner and outer pipes (12, 14). The inner pipe has a polygonal cross section to present a number of edges (12*j*) which extend parallel with the longitudinal axis (15) of the pipe and engage the inner surface (14*c*) of the outer pipe to present the double containment feature, namely the central portion of the inner pipe being one fluid flow path and the spaces (18) between the flat outer sides (12*c*) of the inner pipe and inner surface of the outer pipe forming the second fluid flow path. The outer surface of the inner pipe can be triangular, square, rectangular or otherwise polygonal.

9 Claims, 2 Drawing Sheets

# DOUBLE CONTAINMENT BUTT WELD PIPE FITTING

This invention relates to improvements in double containment pipe fittings and, more particularly, to a pipe fitting with relatively telescoped pipes held apart by an inner pipe with a polygonal cross section.

BACKGROUND OF THE INVENTION

Double containment pipe fittings have been known and used in the past. Typical of these fittings are those found in the following U.S. Pat. Nos. 4,903,719; 4,915,121; 5,141,261; 5,141,260; and 4,886,305.

While these fittings have been useful in a number of applications, there still is room for improvement and the present invention provides an improved double containment fitting which relies upon the geometry of the pipe segments to present inner and outer spaces for fluid flow.

SUMMARY OF THE INVENTION

The present invention is directed to a double containment pipe fitting which can be of metal or plastic and which has an inner and outer pipe. The inner pipe has a polygonal cross section to present a number of edges which extend parallel with the longitudinal axis of the pipe and these edges engage the inner surface of the outer pipe to present the double containment feature, namely the central portion of the inner pipe being one fluid flow path and the spaces between the flat outer sides of the inner pipe facing the inner surface of the outer pipe forming the second path for the assembly or the fitting. The fitting can be such that a cross section of the inner pipe can be triangular, square, rectangular or polygonal. Thus, considerable latitude is or can be achieved with the teachings of the present invention.

The present invention provides an improved double containment pipe fitting which has an inner tube and an outer tube with the inner tube having corners or edges which space the inner tube from the outer tube to form the double containment feature at the inner and outer surfaces of the inner tube.

Other features and advantages of the present invention will become apparent as the following specification progresses, reference being had to the accompanying drawings for an illustration of the invention.

DETAILED DESCRIPTION OF THE PREFERRED EMBODIMENT

Figure 1:
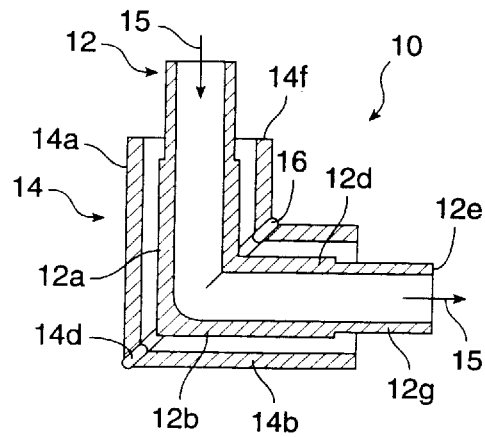
FIG. 1 is a vertical section through a first embodiment of the assembly of the present invention.
Figure 2:
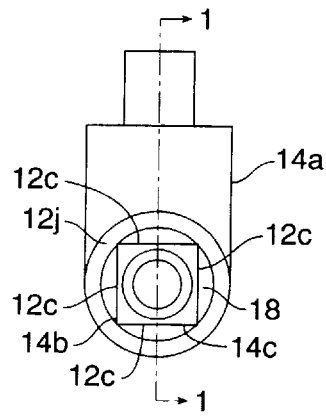
FIG. 2 is an end elevational view of the assembly of FIG. 1.

A first embodiment of the fluid pipe assembly of the present invention is broadly denoted by the numeral 10 and is shown in FIGS. 1 and 2. Assembly 10 includes a pair of tubular pipes 12 and 14, pipe 12 being within pipe 14 and forming an el for the flow of fluid through the pipe 12 along a path, for instance, denoted by the arrows 15 in FIG. 1. Pipe 12 can be of any suitable material, such as metal or plastic and typically is of stainless steel so as to render it especially suitable for use in conveying toxic liquids over a predetermined path. Other fluids, such as gases and other liquids, can be transported through the assembly 10 and specifically through el shaped pipe 12 in either direction.

Figure 3:
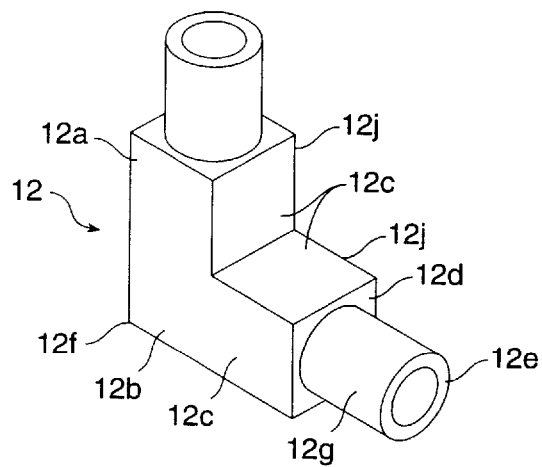
FIG. 3 is an isometric view of the inner pipe member of the assembly of FIG. 1.

The pipe 12 has two mutually perpendicular segments 12a and 12b which are in fluid communication with each other at the central portion of the assembly 10. The pipe 12 has a polygonal cross section (see FIG. 3) so as to present four flat sides 12c which extend from a shoulder 12d to the central location 12f at the central part of the tube 12 presenting a unitary, one-piece structure. The remaining part 12g of segment 12b extends from shoulder 12d to the outer end face 12e of the tube segment 12b and this portion 12g is circular as shown in FIGS. 1 and 3. The junctions between the flat sides 12c of pipe 12 present edges 12j which are parallel with each other and which are adapted to slidably engage the interior cylindrical surface 14c of tube 14. This engagement of the edges 12j with surface 14c is shown in FIG. 2. The side edges 12j of pipe 12 in effect center pipe 12 in pipe 14 when the assembly is complete. While four edges 12j have been shown and described to center pipe 12, it is clear that there could be two or three points of contact, or more than four points of contact, for centering purposes.

Figure 4:
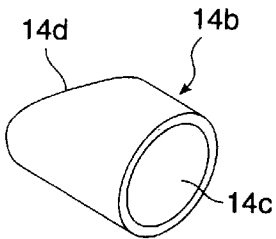
FIG. 4 is an isometric view of one segment of the outer pipe member of the assembly of FIG. 1.

To construct assembly 10, pipe 12a is first made in accordance with the teachings of FIG. 3. Then, pipe segments 14a and 14b are made in accordance with the teachings of FIG. 4.

Pipe 14a and 14b are slidably assembled and centered by edges 12j on legs 12a and 12b of pipe 12 until the angularly cut ends 14d of pipe segments 14a and 14b abut. They are then connected and sealed together with a weld 16 which when complete accurately locates, locks, and centers member 12 within member 14. When so connected, the assembly 10 is formed and the edges 12j of pipe 12 will sealingly engage the inner surfaces of respective segments 14a and 14b. Moreover, the central axis of pipe 12a is coincident with the central axis of pipe 14a. Similarly, the central axis of pipe 12b is coincident with the central axis of pipe segment 14b. The spaces denoted by the numeral 18 are not necessarily sealed from each other. There could be fluid communication between adjacent spaces 18 if desired. However, there is fluid isolation of spaces 18 from the interior of pipe 12. Thus, the assembly 10 can be used for conveying fluids, especially toxic fluids, through pipe 12 while the pipe remains out of fluid communication with tube 14.

In use, the assembly 10 is coupled at its outer end faces 12e such as by welding to a similar, circular end pipe or tube of the same diameter. End faces 14f are also welded to pipes of the same diameter.

Figure 5:
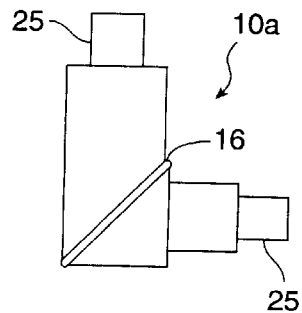
FIGS. 5, 6 and 7 are side elevational views showing reducing elbow, tee and crossing embodiments of the assembly of FIG. 1.
Figure 6:
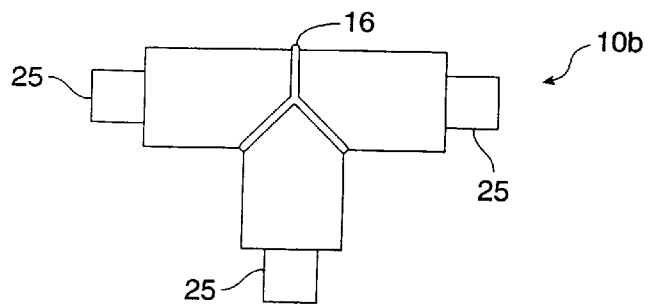
Figure 7:
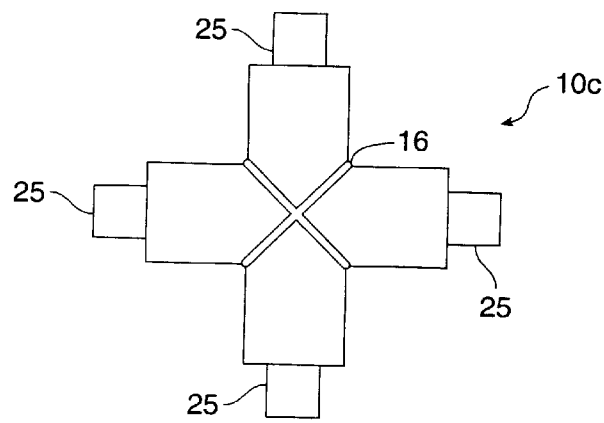

FIGS. 5, 6 and 7 show different configurations for the pipe assembly of the present invention. In each case, where there is an outlet, there is a pipe extension broadly denoted by the numeral 25 so that the assembly can be coupled to another pipe such as by welding or the like. Also in each case of the embodiments of FIGS. 5–7, there are a plurality of edges which extend parallel to the leg in which the edges are received. Thus, the cross section of the inner tube in each of the embodiments of FIGS. 5–7 is polygonal in that there is a pipe having a triangular cross section, a square cross section, a rectangular cross section or another polygonal cross section with at least three edges at the junctions between the flat sides of the leg.

Other modifications and variations can be made to the disclosed embodiment without departing from the subject of the invention as defined by the following claims. For example, structure other than edges 12j can be used to generally center pipe 12 within pipe 14. Sides 12c could be other than flat, such as convex.

I claim:

1. A double containment pipe fitting comprising:

an outer pipe having first and second legs oriented at a first angle to one another, said outer pipe having an inner surface defining a hollow interior;

said first and second legs of said outer pipe having circular end faces;

an inner pipe, housed within said hollow interior of said outer pipe, having third and fourth legs oriented at said first angle to one another said inner pipe being a unitary, one-piece structure;

said third and fourth legs of said inner pipe having circular end faces positioned exterior of said hollow interior; and said inner pipe having a central portion with a generally polygonal outer periphery, said inner pipe and said inner surface sized to define a flow passage within the hollow interior between said inner and outer pipes.

2. The double containment pipe fitting according to claim 1 wherein said inner pipe is a machined metal pipe.

3. The double containment pipe fitting according to claim 1 wherein said first angle is a right angle.

4. The double containment pipe fitting according to claim 1 wherein said generally polygonal outer periphery is square with four flat sides joined along four edges, said edges lying adjacent to said inner surface.

5. The double containment pipe fitting according to claim 1 wherein said central portion of the inner pipe is housed completely within said hollow interior.

6. The double containment pipe fitting according to claim 1 wherein said first and second legs are joined by welding to form said outer pipe.

7. The double containment pipe fitting according to claim 1 wherein said generally polygonal outer periphery comprises faces joined along edges, said flow passage is generally parallel to said edges.

8. The double containment pipe fitting according to claim 1 wherein said inner pipe is centered within said hollow interior.

9. A double containment pipe fitting comprising:

an outer pipe having first and second legs oriented at a first angle to one another, said outer pipe having an inner surface defining a hollow interior;

said first and second legs of said outer pipe having circular end faces;

an inner, metal pipe, said inner pipe being a unitary, one-piece structure housed within said hollow interior of said outer pipe, having third and fourth legs oriented at said first angle to one another;

said third and fourth legs of said inner pipe having circular end faces positioned exterior of said hollow interior; and said inner pipe having a central portion with an outer periphery, said outer periphery being square with four flat sides joined along four edges, said edges lying adjacent to said inner surface, said inner pipe and said inner surface sized to define a flow passage within the hollow interior between said inner and outer pipes, said central portion of the inner pipe being housed completely within said hollow interior.

* * * * *